Patented June 24, 1924.

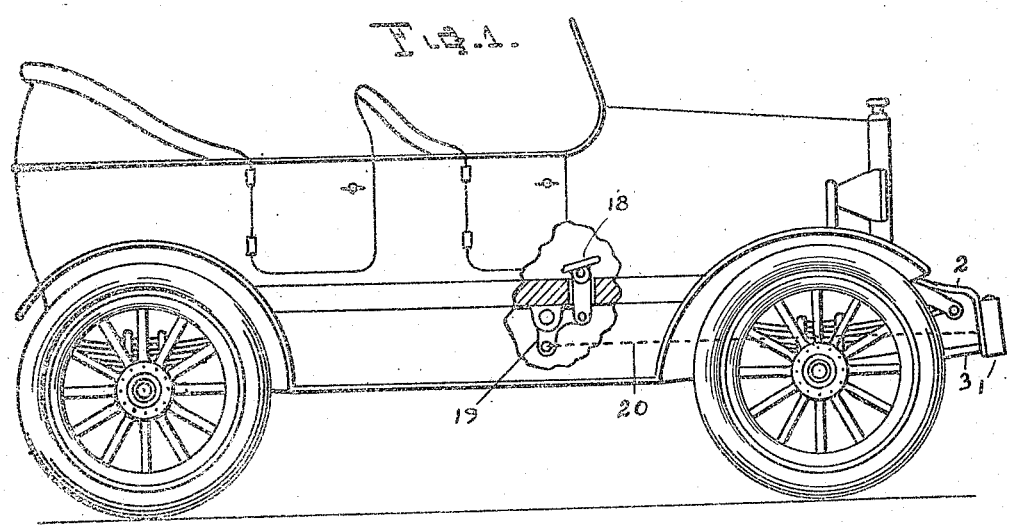
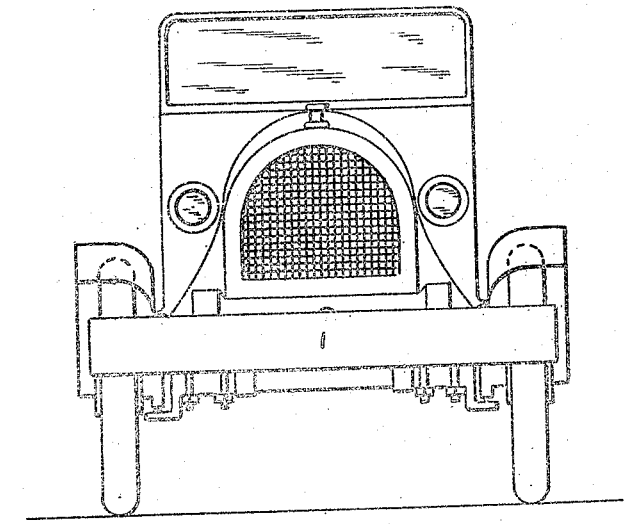

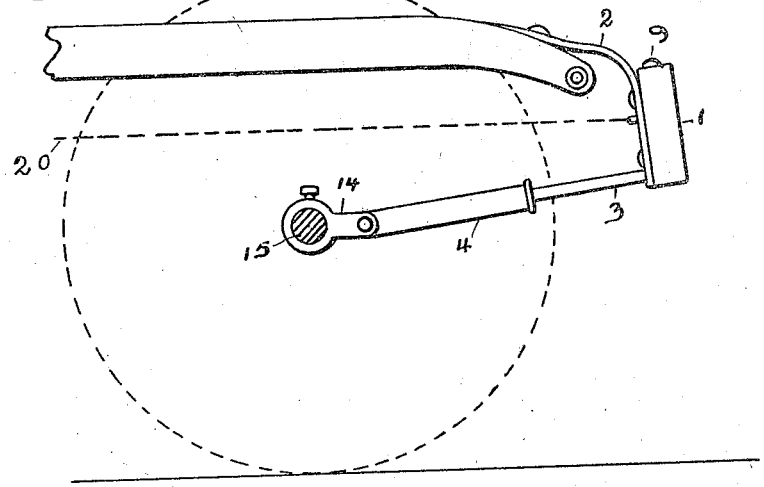
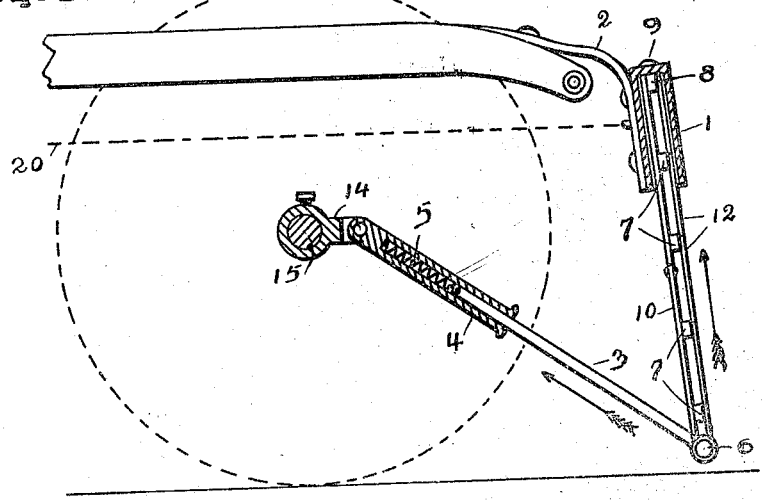

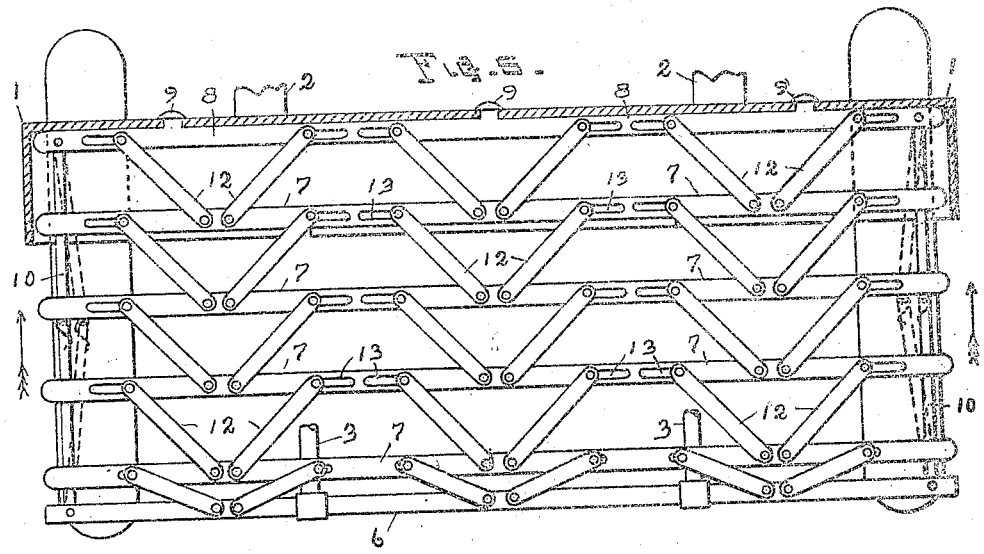

1,498,613

UNITED STATES PATENT OFFICE.

JEAN B. COURSOL, OF OAKLAND, CALIFORNIA; ASSIGNOR OF ONE-HALF TO DOSITHE Z. LEFEBVRE, OF OAKLAND, CALIFORNIA.

SAFETY ATTACHMENT FOR AUTOMOBILES.

Application filed January 2, 1923. Serial No. 610,189.

*To all whom it may concern:*

Be it known that I, JEAN B. COURSOL, a subject of Great Britain, residing in Oakland and county of Alameda, State of California, have invented certain new and useful Improvements in Safety Attachments for Automobiles, whereof the following is a specification.

This invention relates to a safety attachment for automobiles.

Among the objects of the invention are:—

To provide a combined bumper and fender for the front of an automobile.

To provide a fender which, being released by the driver of the machine, will automatically extend in front of the machine, and prevent an object on the road in front of the machine, from getting under the wheels.

To provide a fender which, normally, is retracted within its casing, and is out of sight and out of the way.

Details of the invention, and minor objects and features will appear hereinafter.

In the accompanying three sheets of drawing I have illustrated my invention in its preferred form, and shown it as applied to an automobile.

Figure 1 is a side elevation of an automobile having my invention applied to it in the front of the machine in the place of the usual bumper bar. A portion of the machine is broken away to show the foot control of the fender.

Figure 2 is a front elevation of the same machine, and shows the fender casing.

Figure 3 is a fragmentary side view showing the combined fender casing and bumper, and the connections of the same to the machine. In dotted lines are shown the periphery of a front wheel, and the chain by which the fender is controlled from the foot lever provided for that purpose. The fender is within the casing.

Figure 4 is a similar view to Figure 3, but the fender is lowered into active position, and the casing, and the connection of the lower side of the fender to the axle, are shown in section.

Figure 5 is a face view of the fender, lowered into active position.

Figure 6 is a fragmentary view showing the latch hooks for holding the fender out of action, and for releasing it. The view is taken from behind the fender, with the side removed.

Figure 7 is a top view of the parts shown in Figure 6.

Figures 8 and 9 are details of the side members of the fender.

Referring to the drawings and the figures thereof:—The automobile itself needs no description. On the front of the machine, in the position usually occupied by the buffer, I arrange a casing 1, of sufficiently strong material to act as a buffer. The casing is supported by the springs 2. The lower edge of the casing is supported by the members 3, 4, and 5, as will be explained hereinafter.

The casing member 1 is open at the bottom. Within the casing 1 is an expansible, or collapsible, fender, seen more particularly in its outspread position in Figures 4 and 5. The fender may be composed of a series of lateral bars 6, 7 and 8. The bars 8 are fastened, as by rivets 9 to the upper side of the inverted casing 1. The bar 6 is connected to bar 8 by side members 10 pivotally joined to both said bars, and divided, each, into two parts connected by a rule joint, as seen more particularly in Figures 8 and 9, so as to fold inward when the fender is retracted. Springs 11 foster such folding. The various bars 6, 7 and 8 of the fender are connected together by oblique links 12, pivotally connected to them, and having one end moving in slots, as 13, to permit the fender to collapse.

The bars 3 are pivotally engaged with the bottom lateral bar 6 of the fender and support the latter at that point, whether it be expanded or contracted. The end of each bar 3, remote from the fender, telescopes into a sleeve socket 4, and receives an outward thrust from a spring 5. The sleeve member 4 is pivotally connected to a clip 14 on the front axle 15 of the automobile.

When the fender is raised up, which may be done by hand, and retracted into casing 1, the members 3, 4, 5, swing up with it, and the bars 3 are engaged by hook latches 16 pivotally mounted on the back surface of said casing, and thus the fender is maintained in its retracted position. Springs 17 cause the hooks to engage automatically when the fender is raised. The sloping lower end of the hooks cause them to yield to the passage of the rods 3, and the springs make them swing into engaging position.

At a convenient point within reach of the driver's foot, and in the floor of the automobile, is a treadle 18, see Figure 1. The treadle 18 connects with one arm of a bent lever 19, pivoted beneath the floor of the vehicle. The other arm of lever 19 connects by a chain 20, passing over suitable idlers 21, with the hooks 16. When the driver of the vehicle sees any obstacle on the road, such as a person, animal or other objects, which he does not wish to run over, he presses the treadle 18, thereby drawing back hooks 16 from their engagement with rods 3, and the fender falls by its own weight coacting with springs 11 of the side member 10 and engages the obstacle and prevents it from getting under the wheels.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit and scope of my invention as defined in the appended claims.

What I claim and desire to secure by Letters Patent of the United States, is the following, to-wit:—

1. An automobile attachment, comprising a casing adapted for elastic connection to the front of the vehicle, a fender contracted within said casing and adapted by its gravity to drop with its lower edge approximating the ground, a yielding member adapted to connect said lower edge with the front axle of the vehicle and spring actuated hooks mounted upon said casing and adapted to engage and hold said yielding member in contracted position.

2. A combined bumper and fender attachment for automobiles comprising an inverted casing member adapted for yielding connection to the front of the vehicle, a lattice-like fender member contracted into said casing member and capable of expanding thereout, an elastically yielding connection of the lower edge of the fender with the front axle of the vehicle, said connection having a rod, a sleeve into which said rod telescopes and a spring tending to push said rod out of said sleeve, oppositely disposed spring actuated hooks mounted upon said casing and adapted to engage and hold said yielding connection and fender in contracted position within the casing and means for releasing said hooks.

In testimony that I claim the foregoing, I have hereto set my hand this 4th day of December, 1922.

JEAN B. COURSOL